(12) United States Patent
Black

(10) Patent No.: US 12,379,034 B2
(45) Date of Patent: *Aug. 5, 2025

(54) CATALYST CONTROL AND WITHDRAWAL VALVE WITH TIGHT SHUTOFF CAPABILITY

(71) Applicant: BLAC INC., Elmhurst, IL (US)

(72) Inventor: Philip B. Black, Elmhurst, IL (US)

(73) Assignee: BLAC INC., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,398

(22) Filed: Dec. 12, 2022

(65) Prior Publication Data

US 2023/0106275 A1    Apr. 6, 2023

Related U.S. Application Data

(63) Continuation of application No. 17/235,442, filed on Apr. 20, 2021, now Pat. No. 11,525,517.

(60) Provisional application No. 63/012,571, filed on Apr. 20, 2020.

(51) Int. Cl.
| | |
|---|---|
| *F16K 3/18* | (2006.01) |
| *B01J 4/00* | (2006.01) |
| *F16K 3/02* | (2006.01) |
| *F16K 3/316* | (2006.01) |

(52) U.S. Cl.
CPC ............... *F16K 3/186* (2013.01); *B01J 4/001* (2013.01); *F16K 3/0218* (2013.01); *F16K 3/0263* (2013.01); *F16K 3/316* (2013.01)

(58) Field of Classification Search
CPC ........ F16K 3/186; F16K 3/316; F16K 3/0218; F16K 3/0263; B01J 4/001

USPC .................................................. 251/203–204
See application file for complete search history.

(56) References Cited

U.S. PATENT DOCUMENTS

| | | | | |
|---|---|---|---|---|
| 1,482,836 | A ‡ | 2/1924 | Brubaker | ................ F16K 3/184 |
| | | | | 251/203 |
| 2,255,829 | A | 9/1941 | Spang et al. | |
| 2,666,615 | A | 1/1954 | Laurent | |
| 4,253,487 | A * | 3/1981 | Worley | ................... F16K 3/029 |
| | | | | 251/212 |

(Continued)

FOREIGN PATENT DOCUMENTS

| | | |
|---|---|---|
| CA | 2814094 | 11/2013 |
| GB | 2177743 | 1/1987 |

(Continued)

OTHER PUBLICATIONS

Search Report & Written Opinion issued in Appl. No. PCT/US2021/028160 (2021).

(Continued)

*Primary Examiner* — John Bastianelli
(74) *Attorney, Agent, or Firm* — Barnes & Thornburg LLP

(57) ABSTRACT

A slide valve having a valve disc that is slidably movable between a fully-retracted fully-open position and a fully-extended fully-closed tight shutoff position by an actuating stem. The actuating stem is flexibly coupled to the valve disc. The valve disc is selectively modulated between the fully-extended fully-closed tight shutoff position and a partially-retracted non-tight shutoff position to prevent sticking of the valve disc in the fully-extended fully-closed tight shutoff position.

14 Claims, 8 Drawing Sheets

(56) References Cited

U.S. PATENT DOCUMENTS

| | | | | |
|---|---|---|---|---|
| 4,513,947 A | ‡ | 4/1985 | Amend | F16K 3/20 |
| | | | | 251/159 |
| 4,612,955 A | ‡ | 9/1986 | Purvis | F16K 3/029 |
| | | | | 137/375 |
| 4,711,392 A | | 12/1987 | Kidouchi et al. | |
| 5,039,063 A | ‡ | 8/1991 | Louch | F16K 3/0281 |
| | | | | 251/328 |
| 5,895,028 A | ‡ | 4/1999 | Varady | F16K 3/34 |
| | | | | 251/205 |
| 2003/0038265 A1 | ‡ | 2/2003 | Koerner | F16K 3/12 |
| | | | | 251/203 |
| 2006/0219969 A1 | ‡ | 10/2006 | Young | F16K 3/0227 |
| | | | | 251/203 |
| 2011/0220828 A1 | ‡ | 9/2011 | Kennedy | F16K 3/0218 |
| | | | | 251/328 |
| 2018/0275691 A1 | | 9/2018 | Lattanzio et al. | |
| 2019/0063618 A1 | ‡ | 2/2019 | Guest | F16K 3/265 |

FOREIGN PATENT DOCUMENTS

| | | |
|---|---|---|
| RU | 172359 U | 7/2017 |
| WO | WO 2005/064236 | 7/2005 |
| WO | WO 2020/068120 | 4/2020 |

OTHER PUBLICATIONS

Extended European Search Report issued in EP 22186646.0 (Mar. 18, 2024).

\* cited by examiner
‡ imported from a related application

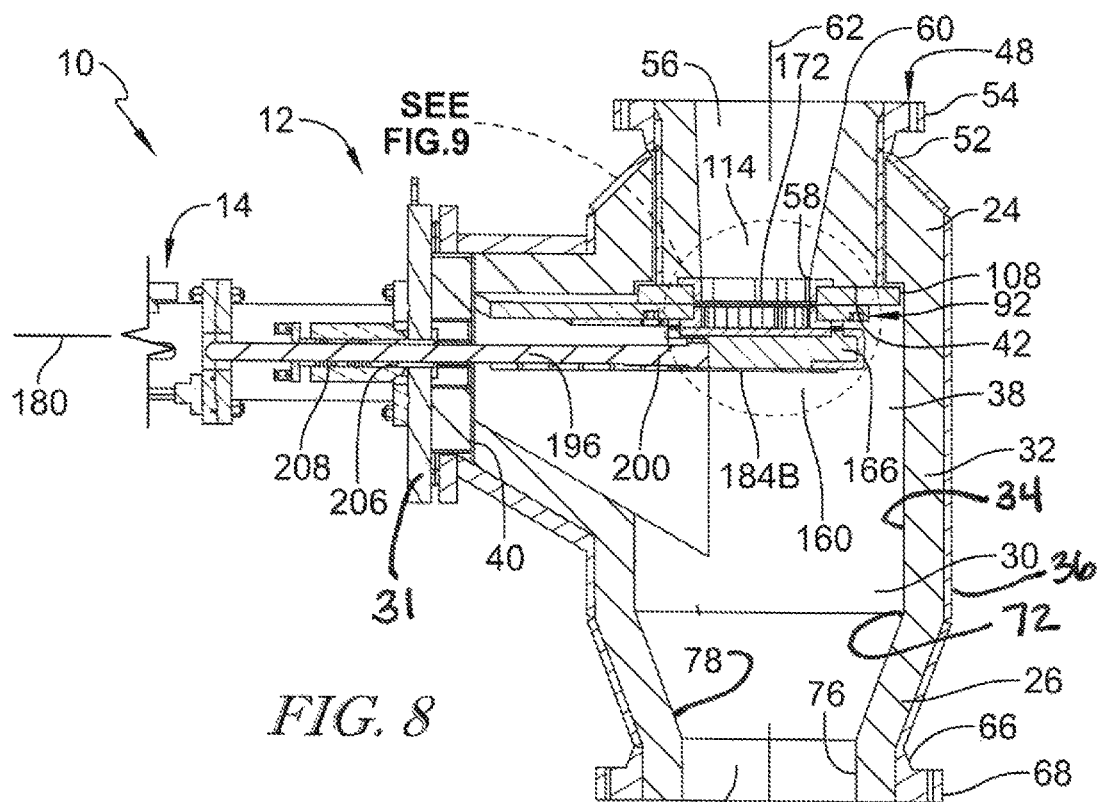
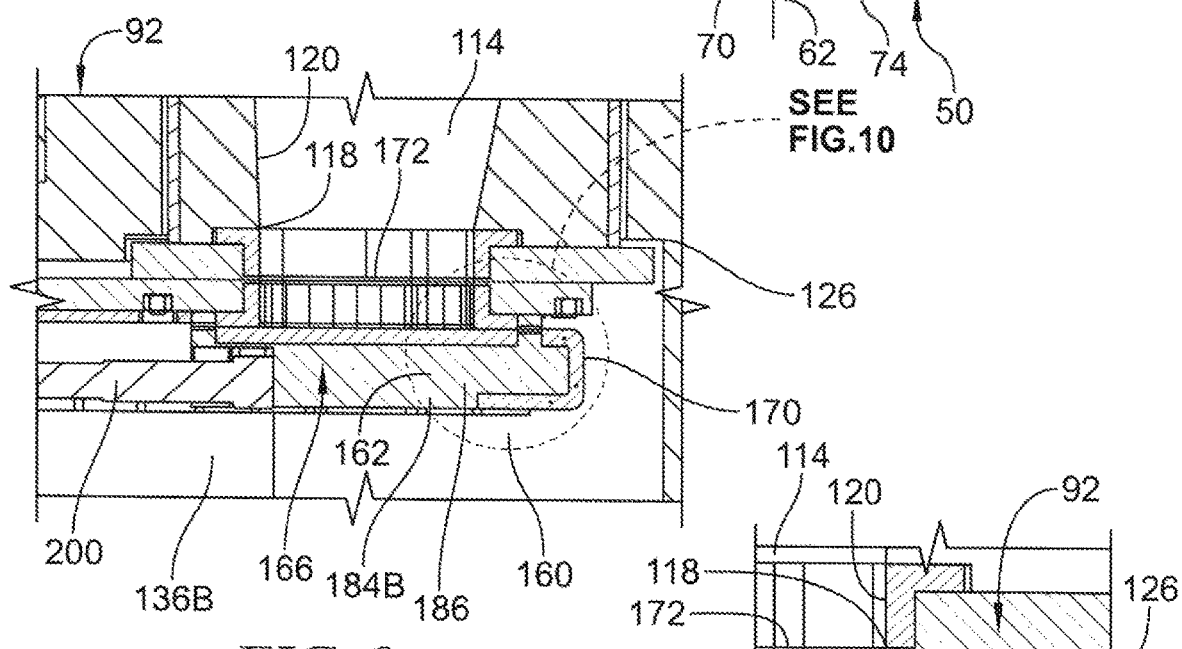

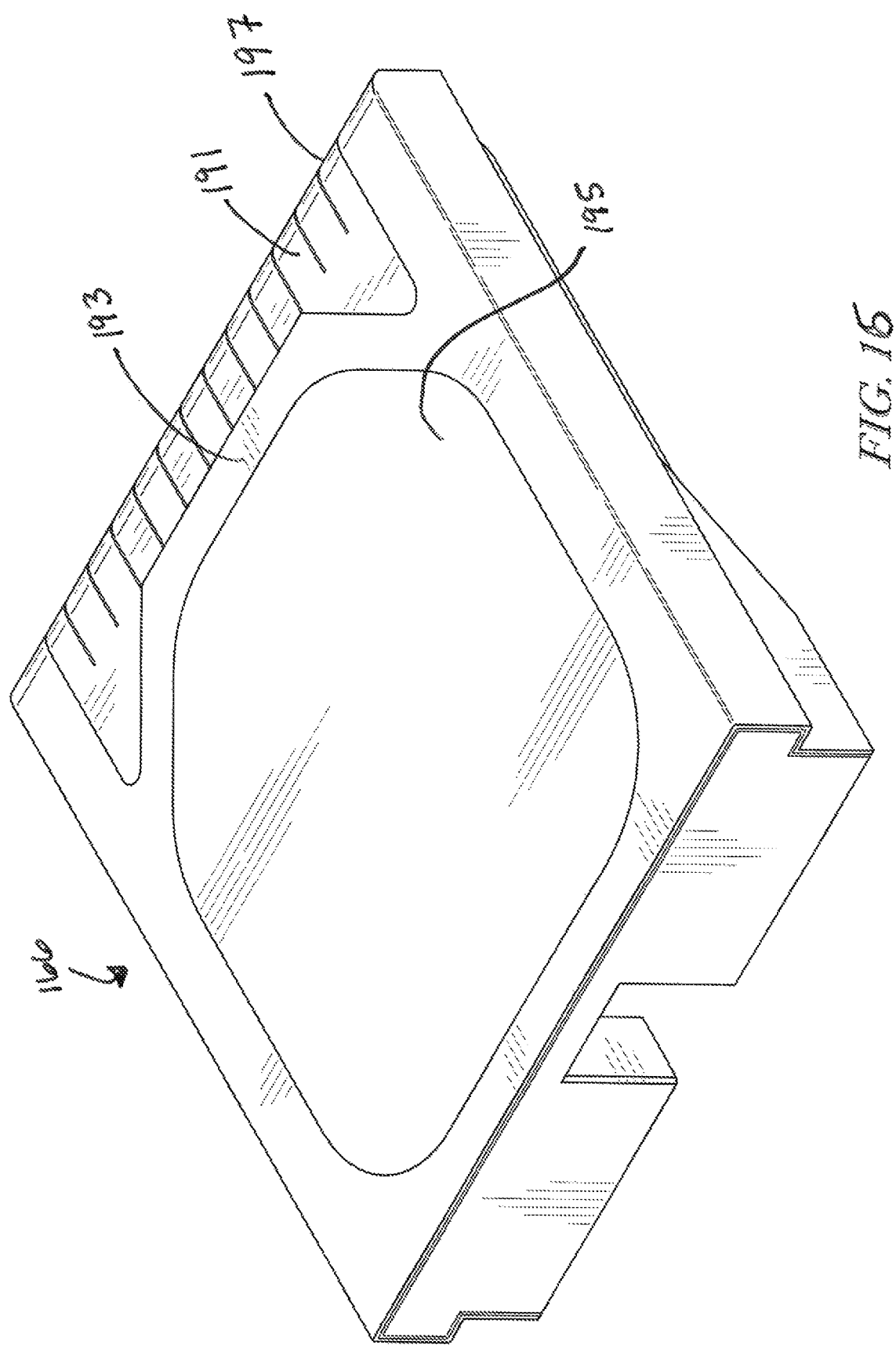

CATALYST CONTROL AND WITHDRAWAL VALVE WITH TIGHT SHUTOFF CAPABILITY

CROSS REFERENCE TO RELATED APPLICATIONS

This application is a Continuation of U.S. patent application Ser. No. 17/235,442, filed Apr. 20, 2021, which claims priority under 35 U.S.C. § 119(e) to U.S. Provisional Application Ser. No. 63/012,571, filed Apr. 20, 2020. The disclosures set forth in the above-referenced applications are expressly incorporated herein by reference in their entirety.

BACKGROUND

The present disclosure relates to valves, and particularly to slide gate valves. More particularly, the present disclosure relates to slide gate valves used in services for catalyst control and for catalyst withdrawal valves for controlling the flow of gas and catalyst material in a fluid catalytic cracking process.

Fluid catalytic cracking is a process used in petroleum refineries for converting high boiling, high-molecular weight hydrocarbon fractions of petroleum crude oils into more valuable gasoline, olefinic gases and other products. The feedstock to a fluid catalytic cracking process is usually that portion of the crude oil that has initial boiling point of 644 degrees Fahrenheit (° F.) or higher at atmospheric pressure and an average molecular weight ranging from about 200 to 600 or higher. The feedstock is heated to a high temperature and moderate pressure, and brought into contact with a hot powdered catalyst.

The catalyst breaks the long-chain molecules of the high-boiling hydrocarbon liquids into much shorter molecules, which are collected as vapor. Heated feedstock is injected into a catalyst riser where it is vaporized and cracked into smaller molecules of vapor by contact and mixing with the very hot powdered catalyst provided from a catalyst regenerator. Catalyst flows into a reactor having a vessel in which the cracked product vapors are separated from spent catalyst and the spent catalyst is returned to the catalyst regenerator vessel via the spent catalyst flow line. The flow of regenerated catalyst to the reactor is regulated by the regenerated catalyst flow line and a riser section. Three slide valves primarily control this flow of catalyst between the regenerator and reactor vessels—typically named the Rx Catalyst, the Spent Catalyst and Regenerated Catalyst valves. There are two other valves that are used for control of catalyst from the regenerator in a flow scheme that flows back to the regenerator which are named Recirculation and Cooled Catalyst valves. These applications are found with various names in Fluid Cokers, Flexicokers, FCCU, RFCCU, DCCU, DCU and other similar type refinery processes that utilize refractory lined slide valves for the control of particulate flowing applications at high temperature.

There is a continuous loss of reactivity of the catalyst through time and through deterioration of the catalyst particle. This loss of reactivity needs to be remedied in the fluid catalytic cracking process over time by unloading catalyst from the regenerator and by loading new catalyst into the regenerator. Both of these processes require the use of special slide gate valves that do not wear when the catalyst impinges on the internal surfaces during operation.

The catalyst comprises fine powders or particles having a particle size distribution ranging from approximately 5 microns to approximately 40 microns in size. The catalyst may include crystalline zeolite, a matrix, a binder, and filler components. The matrix component may comprise an alumina matrix component. The binder may be silica sol, and the filler may be a clay such as kaolin.

Slide gate valves that are used in the service of regenerated, spent, Rx, recirculation, cooled catalyst or for the service of catalyst withdrawal valves encounter problems in function and operation due to several factors. Slide gate valves for catalyst control and withdrawal applications need to operate in a very wide range of temperature conditions, from ambient temperature conditions which could be as low a temperature as approximately thirty degrees Fahrenheit below zero (−30° F.) to an operating temperature of approximately 1350° F. or higher the instant the valve is opened or even partially opened or used for controlling the flow of catalyst. The flow of hot catalyst through the valve provides a temperature shock to the valve and causes failures to wear resistant surfaces and components of the valve.

The flow of hot catalyst through the valve is also extremely hard on the valve body, guides, orifice plate, actuating stem and disc of the valve. All components of the slide valve are subjected to tremendous stresses due to temperature fluctuations between instantaneous heating, when flow of catalyst has started, to cooling down of the valve after the flow of catalyst has stopped. Premature failures of the slide valve occur as a result of this extreme set of temperature related operating conditions.

The flow of catalyst through the slide valve is also highly erosive and causes wear to the slide valve and its component parts. Even though the catalyst particles are small in size, flowing catalyst "sand blasts" any surface the catalyst comes into contact with, but at a much higher rate than a regular cube type silica sand particle. The flow of catalyst through the valve is driven by the pressure differential between the pressure on the upstream side of the valve and the pressure that is found downstream of the valve. This can be in the spent, regenerated, Rx, Catalyst Cooler, and recirculation services of up to as much as 20 pounds per square inch (psig). For the catalyst withdrawal valve service, the valve is connected to the bottom of the regenerator, which pressure can be as high as 45 pounds per square inch gage (psig) or more, and the pressure on a downstream side of the valve where there is a partial or full vacuum. The pressure drop across the catalyst withdrawal valve is very high for this type of valve to survive. Normal operation of a slide valve is usually kept at less than 12 pounds per square inch differential pressure or less during flow operation, and very seldom does operation occur with the valve at a 15 to 20 pounds per square inch pressure differential. A slide valve used as a catalyst withdrawal valve may see as much as 40 or 45 pounds per square inch pressure drop across the valve.

An additional problem that may be encountered by a catalyst withdrawal valve occurs when there is a two-way flow through the valve. In such an operation, catalyst is first loaded into the regenerator at the startup of the process through the catalyst withdrawal valve, such that the flow of catalyst occurs in the opposite direction of what is considered normal flow. In such an operation the internal components of the valve need to be designed for flow of catalyst in both directions with respect to the valve, and with erosion or wear protection provided to the components of the valve for both directions of flow.

A further problem encountered with prior slide valves is that the valve actuating stem, which moves the valve disc between open and closed positions, tended to bend when a force was applied by the actuating stem to the valve disc to move the valve disc into the closed position. The bending of the actuating stem caused premature failure of the packings in the actuating stem stuffing box, and was not controllable at the end of stroke position. In addition, the disc would sometimes hit a mechanical stop at the end of the closing stroke of the valve disc before the valve disc reached its fully closed position due to interference with catalyst buildup inside the valve.

SUMMARY

According to the present disclosure, a slide valve includes a valve disc and a disc receptacle. The disc receptacle includes disc guides and an orifice plate including an orifice, the disc valve being selectively slidable within the disc guides between a fully-retracted fully-open position that allows gas and particle flow through the orifice and a fully-extended fully-closed tight shutoff position that seals the orifice and prevents gas and particle flow through the orifice.

In illustrative embodiments, the valve disc and the disc receptacle include respective inclined wedges that engage each other to wedgingly press the valve disc into sealing engagement with the orifice plate when the valve disc is in the full-extended fully-closed tight shutoff position. The valve disc being selectively modulated between the fully-extended fully-closed tight shutoff position and a partially-retracted non-tight shutoff position wherein a small air gap is formed between the valve disc and the orifice plate that allows gas to flow out of the orifice and through the air gap between the valve disc and the orifice plate, while preventing particles from flowing out of the orifice and through the air gap.

In illustrative embodiments, an actuating stem is coupled at a first end to a hydraulic cylinder (actuator) or an electric operated drive assembly (actuator) and is coupled at a second end to the valve disc. The actuator is adapted to selectively linearly slide the actuator stem and valve disc between the fully-retracted fully-open position, the fully-extended fully-closed tight shutoff position, and the partially-retracted non-tight shutoff position. The second end of the actuating stem is flexibly coupled to the valve disc such that the valve disc is movable with respect to the second end of the actuating stem whereby the disc valve will not impart bending forces to the actuating stem as the valve disc is moved by the actuator.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers the accompanying figures in which:

FIG. 8 is a cross sectional view of the slide valve taken along line 8-8 of FIG. 1 showing the valve disc in the fully-extended fully-closed tight shutoff position with respect to the orifice plate of the disc receptacle;

FIG. 9 is a detail view taken along line 9 of FIG. 8 showing the disc in the fully-extended fully-closed tight shutoff position;

FIG. 10 is a detail view taken along line 10 of FIG. 9 showing the disc in the fully-extended fully-closed tight shutoff position;

FIG. 16 is a perspective view of the valve disc.

DETAILED DESCRIPTION

Figure 1:
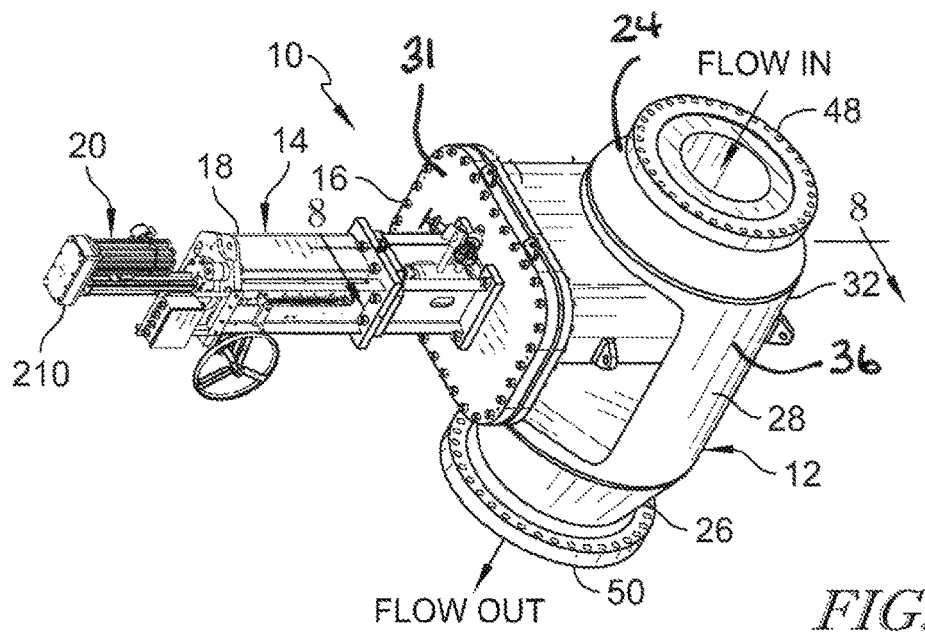
FIG. 1 is a front perspective view, in accordance with the present disclosure, showing a slide valve and illustrating the direction of flow of catalyst into the valve and the flow of catalyst out of the valve during normal flow operation when used in a catalyst withdrawal process.

A valve 10, such as a slide valve, in accordance with the present disclosure, is shown in FIGS. 1-14. Valve 10 may comprise a catalyst withdrawal valve as used in connection with fluid catalytic cracking, and other processes, for controlling the flow of particles, such as a catalyst. Valve 10 includes a body 12, an elongate housing 14 having a first end 16 coupled to housing 14 and a second end 18. An actuator 20 is coupled to second end 18 of housing 14.

Valve 10 includes a gate assembly 90, as shown in FIGS. 4-7. Gate assembly 90 includes an orifice plate 92, a valve disc 166, driven by an actuator 20 and a pair of disc guides 136a, 136b that allow the valve disc 166 to move with respect to the orifice plate 92 from a first closed position where the valve disc 166 blocks orifice 114, as shown in FIG. 8, to a second open position where valve disc 166 is removed from blocking orifice 114, as shown in FIG. 14, to allow for the flow of gas and particles through orifice 114.

Figure 14:
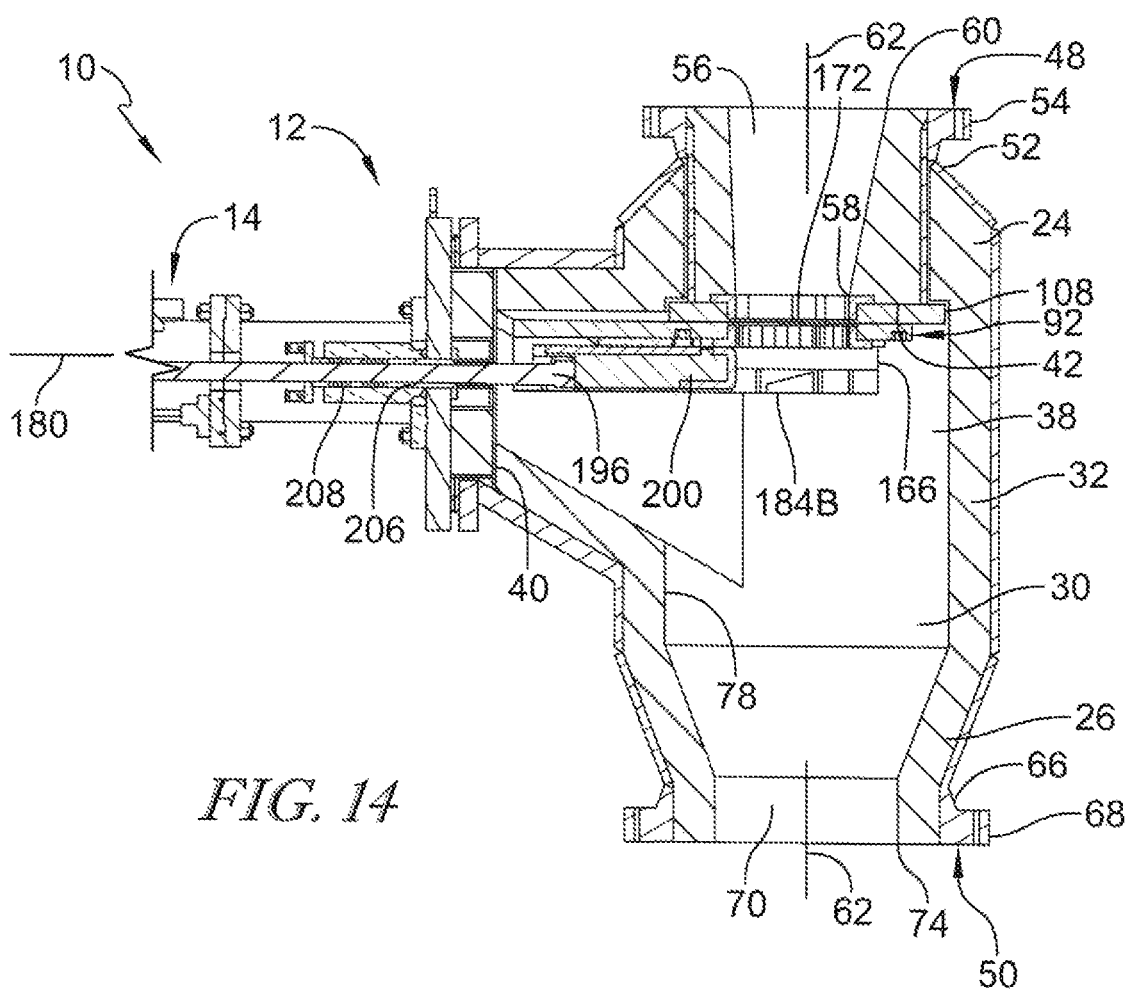
FIG. 14 is a cross sectional view of the valve shown with the valve disc in the fully-retracted fully-open position with respect to the orifice plate wherein catalyst is permitted to flow through the valve.

When actuator 20 slidably moves actuating stem 196 and valve disc 166 from the fully-retracted fully-open position of disc 166, as shown in FIG. 14, toward the fully-extended fully-closed position of disc 166, as shown in FIG. 8, wedge surfaces 162 of wedges 160 engage wedge surfaces 186 of wedges 184A-B of disc 166. Wedge surfaces 162 of wedges 160 wedgingly press top surface 172 of disc 166 in a direction generally transverse to axis 180 and generally parallel to central axis 62 into sealed engagement with orifice plate 92 and sealing surface 128 of ring 126. Disc 166 thereby tightly and completely seals orifice 114 and inlet passageway 56 of inlet 48 from chamber 38 of body 12 and outlet passageway 70 of outlet 50 and prevents the flow of gas and the flow of particles in the gas-solid mixture from flowing through orifice 114 into chamber 38 and outlet passageway 70.

Figure 11:
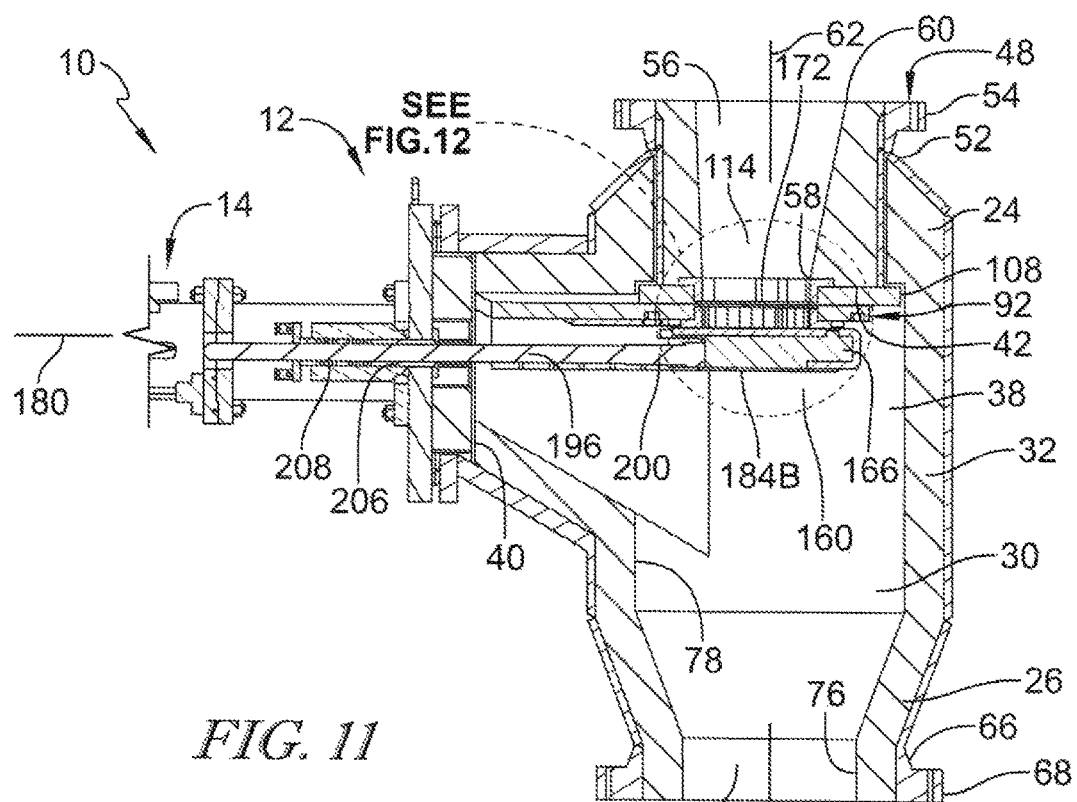
FIG. 11 is a cross sectional view of the slide valve similar to the cross section of FIG. 8, but showing the valve disc partially retracted from the fully-extended fully-closed tight shutoff position to a partially-retracted non-tight shutoff position with respect to the orifice plate.
Figure 12:
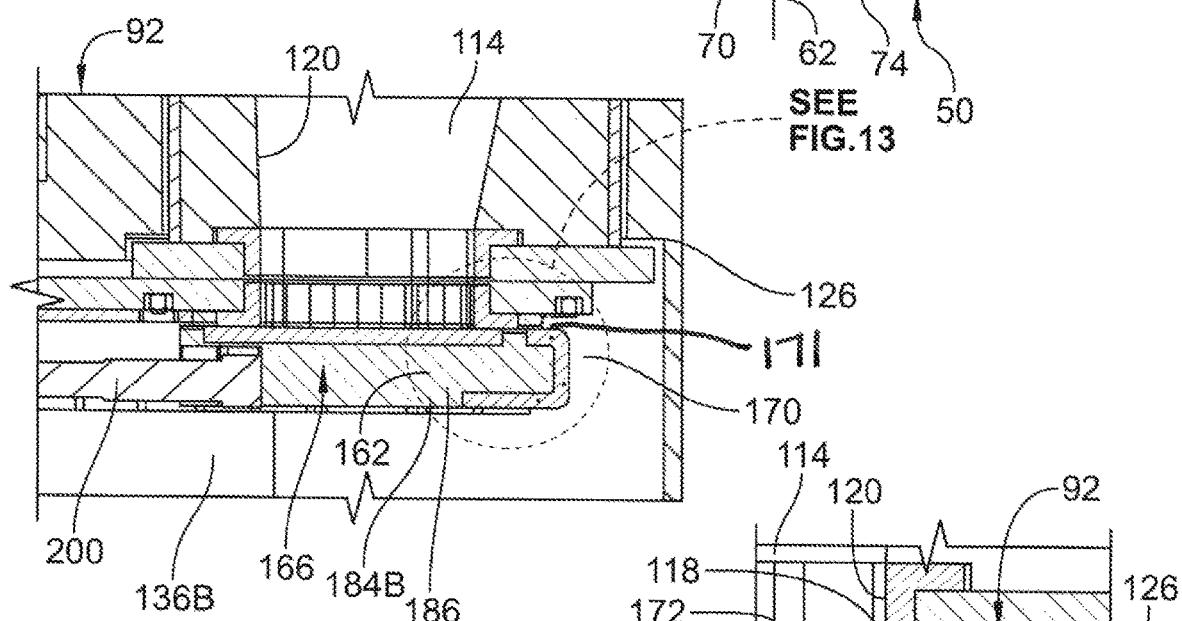
FIG. 12 is a detail view taken along line 12 of FIG. 11 showing the valve disc spaced a short distance from the orifice plate when the valve disc is in the partially retracted non-tight shutoff position such that a small air gap is formed between the valve disc and the orifice plate.
Figure 13:
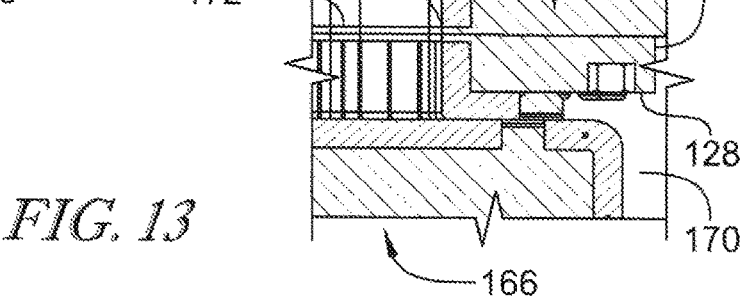
FIG. 13 is a detail view taken along line 13 of FIG. 12 showing the air gap between the valve disc and the orifice plate when the valve disc is in the partially-retracted non-tight shutoff position.

In order to prevent disc 166 from becoming stuck in the fully-extended fully-closed tight shutoff position as shown in FIGS. 8-10, valve disc 166 may be periodically modulated or slidably moved between the fully-extended fully-open tight shutoff position and a slightly partially-retracted non-tight shutoff position as shown in FIGS. 11-13. When actuator 20 partially retracts actuating stem 196 and disc 166 along axis 180 to the partially-retracted non-tight shutoff position, as shown in FIGS. 11-13, disc 166 is moved a very short distance along axis 180 and away from side wall 32 of body 12. This slight movement of valve disc 166 with respect to orifice plate 92 prevents the valve disc 166 from sticking to the orifice plate 92. Valve disc movement to the partially retracted non-tight shutoff position creates a slight opening to allow some gas, but not particles, to pass through the orifice 114 because of the nominal size of the gap 171 between disc 166 and orifice plate 92.

Body 12 of valve 10 includes a top portion 24, a bottom portion 26 spaced apart from the top portion 24, and a cylindrical side wall 28. Side wall 28 extends between opposite ends of top portion 24 and bottom portion 26. Top portion 24, bottom portion 26 and side wall 28 together form an interior surface 34 and an exterior surface 36. Body 12 includes a hollow interior chamber 38 formed by and within top portion 24, bottom portion 26 and side wall 28. Body 12 includes a flange 30 that is formed to include an opening 40. Opening 40 is configured to accept bonnet 31. Bonnet 31 seals off opening 40 of flange 30 and includes a bracket assembly 33 that supports the actuator 20, which drives actuating stem 196. Opening 40 is in fluid communication with chamber 38. Top portion 24 of valve 10 includes a recessed pocket 42 formed in interior surface 34 of top portion 24.

Body 12 of valve 10 includes an inlet 48 in fluid communication with chamber 38 and an outlet 50 in fluid communication with chamber 38, as shown in FIG. 8. Inlet 48 includes a tubular stem 52 coupled to and extending outwardly from top portion 24. An outwardly extending flange 54 may be coupled to an outer end of stem 52. Flange 54 may include a plurality of bolt holes arranged in a generally circular or rectangular bolt-hole pattern about the central axis of stem 52. Inlet 48 includes a fluid inlet passageway 56 that extends through top portion 24, stem 66 and flange 68. Inlet passageway 56 is in selective fluid communication with chamber 38 of body 12. Inlet passageway 56 includes a first port 58 formed in interior surface 34. Inlet passageway 56 includes a second port 60 formed in inlet 48. First port 58 and second port 60 are in fluid communication with one another. Inlet passageway 56 extends between first port 58 and second port 60 along central axis 62. Inlet passageway 56 is formed by a generally cylindrical side wall in stem 52 that extends between first port 58 and second port 60.

Outlet 50 includes a tubular stem 66 that is coupled to and extends outwardly from bottom portion 26 of body 12. An outwardly extending flange 68 may be coupled to an outer end of stem 66. Flange 68 may include a plurality of bolt holes arranged in a generally circular or rectangular bolt-hole pattern. Outlet 50 includes a fluid outlet passageway 70 that extends through bottom portion 26, stem 66 and flange 68. Outlet passageway 70 is in fluid communication with chamber 38 of body 12. Outlet passageway 70 includes a first port 72 formed in the interior surface 34 of bottom portion 26 and a second port 74 formed in the outer end of flange 68. First port 72 and second port 74 are in fluid communication with one another.

Outlet passageway 70 extends along central axis 62 such that inlet passageway 56 and outlet passageway 70 are generally coaxially aligned with one another along central axis 62. Outlet passageway 70 may be formed by a generally cylindrical sidewall 76 that extends inwardly from second port 74. Outlet passageway 70 may also be formed by a generally conical-shaped side wall 78 that extends between interior surface 34 of bottom portion 26 and cylindrical side wall 76. Conical side wall 78 tapers inwardly as it extends from interior surface 34 of bottom portion 26 toward cylindrical side wall 76. Body 12 of valve 10 may be formed from a metal material.

Figure 5:
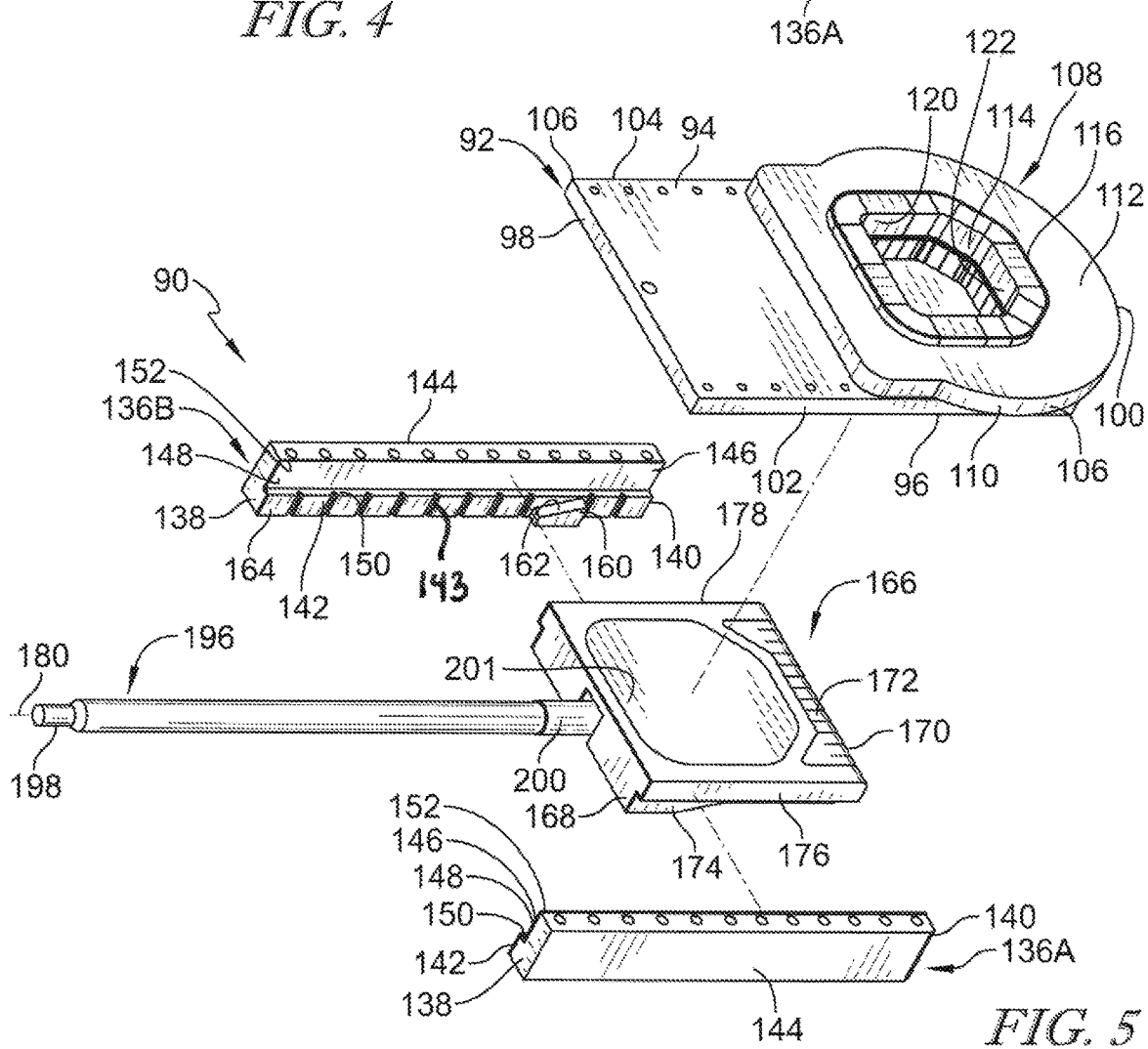
FIG. 5 is a front exploded view of the gate assembly of FIG. 4 additionally showing the valve disc moveably coupled to a distal end of the actuating stem.

Valve 10 includes a gate assembly 90 as shown in FIGS. 4-7. Gate assembly 90 includes a disc receptacle 91 that is located within chamber 38 of body 12 and that is coupled to body 12. Disc receptacle 91 includes an orifice plate 92. Orifice plate 92 may be generally rectangular as shown in FIG. 5 and includes a generally planar top wall having a generally planar top surface 94 and a generally planar bottom wall having a bottom surface 96 spaced apart from and generally parallel to top surface 94. Orifice plate 92 includes a generally linear first end 98 and a spaced apart and generally parallel and linear second end 100. Orifice plate 92 includes a first side edge 102 that extends generally linearly between first end 98 and second end 100 of orifice plate 92, and a second side edge 104 that extends generally linearly between first end 98 and second end 100 of orifice plate 92 generally parallel to and spaced apart from first side edge 102. First and second side edges 102 and 104 each include a seat member 106 that extends from the top surface 94 of orifice plate 92. Seat member 106 includes a generally cylindrical side wall 108 that forms a perimeter of seat member 106 that is adapted to be seated and located within pocket 42 of top portion 24 of body 12 with end wall 112 of projection 108 in mating sealing engagement with the bottom wall of pocket 42.

Figure 7:
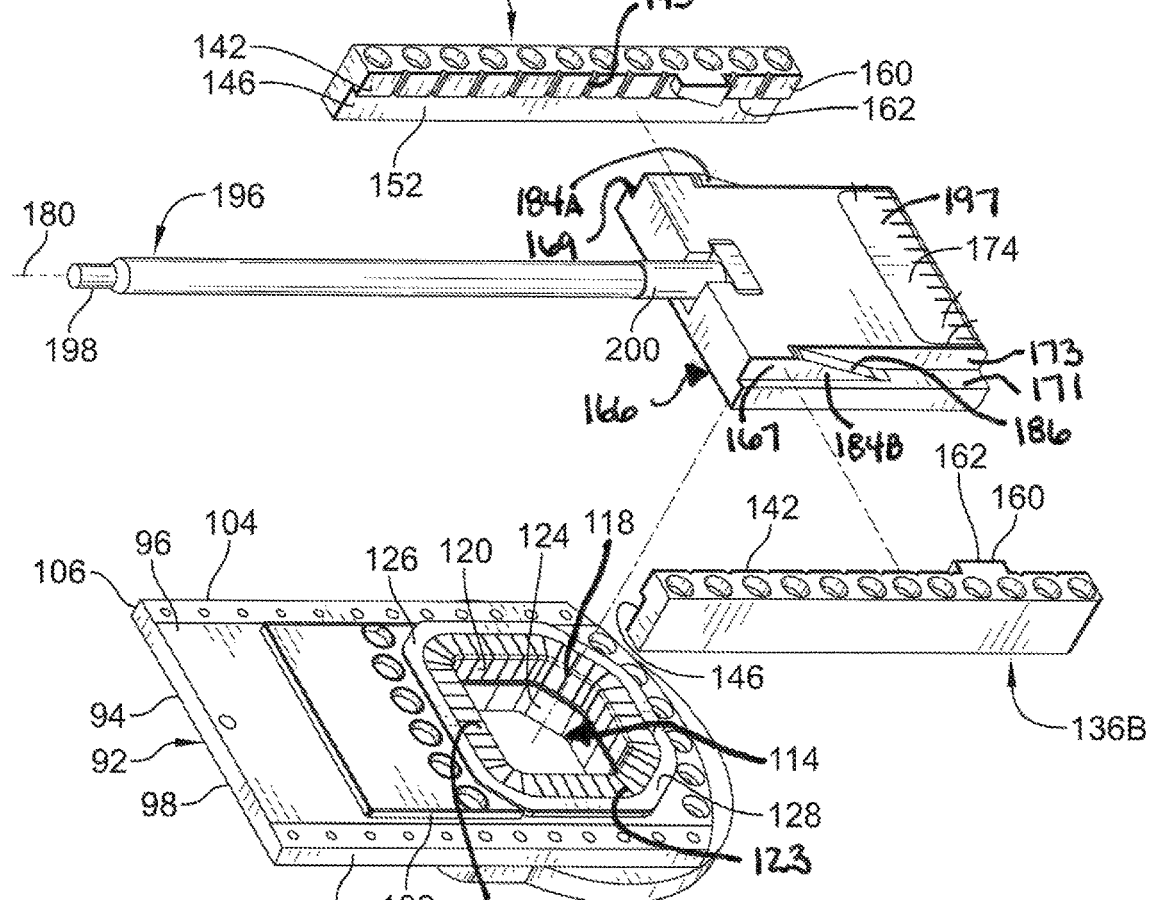
FIG. 7 is a rear exploded view of the gate assembly.

Orifice plate 92 of gate assembly 90 includes an orifice 114 that extends through orifice plate 92 and seat member 106 and that forms a fluid passageway through orifice plate 92 and seat member 106. Orifice 114 includes a first port 116 located in end wall 112 of seat member 106 and a second port 118 located in bottom surface 96 of orifice plate 92. Orifice 114 includes a side wall 120 that extends between first port 116 and second port 118, as shown in FIG. 7. The side wall 120 and the area around the orifice 114 includes a refractory liner 122. The refractory liner 122 is erosion resistant and provides thermal insulation to limit damage to orifice plate 92 caused by the high temperatures and abrasive material. Refractory material 122 is secured in position by retainers 123 positioned in-between a wear resistant liner 122. In essence, refractory material 122 surrounds orifice 114 of orifice plate 92.

Orifice plate 92 also includes a sealing member 126, as shown in FIG. 7. Seal member 126 surrounds orifice 114 and is positioned radially outwardly from refractory materials 122. Sealing member 126 is preferably formed from an erosion and wear resistant material such as a STELLITE alloy sold under the STELLITE trademark of Kennametal Inc. STELLITE alloy is used on the sealing member 126 and retainers 123 to limit corrosion and wear. Refractory material 122 positioned between orifice 114 and seal member 126 helps prevent hot gases and abrasive material from wearing away sealing member 126 when disc 166 is opened. Wear resistant liner 122 extends between first port 116 and second port 118. Seal member 126 includes a planar sealing surface 128 that sealing engages with valve disc 166. Sealing surface 128, may be ground smooth to around a RMS 32 finish, so as to provide a very flat and smooth sealing surface to prevent unwanted leakage.

Figure 6:
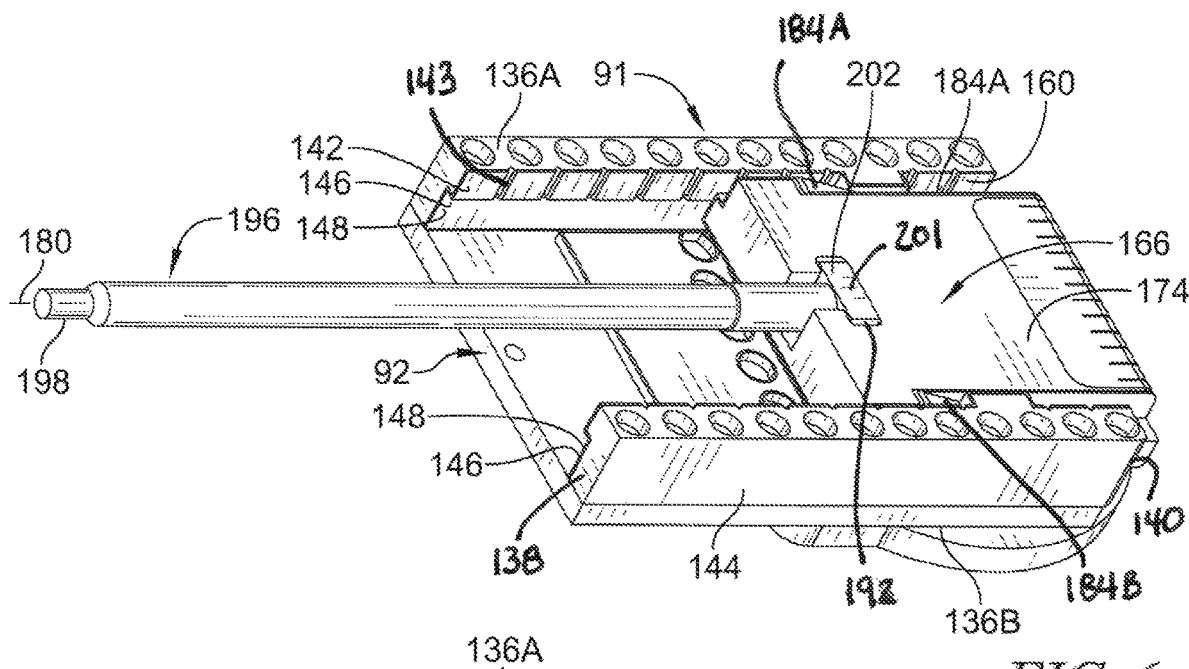
FIG. 6 is a rear perspective view of the gate assembly.

Receptacle 91 of gate assembly 90 also includes a disc guide 136A and a disc guide 136B, as shown in FIGS. 6 and 7 and are configured to form receptacle 91 in which valve disc 166 slides from an open to a closed position. Disc guides 136A-B are constructed substantially identical to one another although in a mirror image to one another. Each disc guide 136A-B extends between a first end 138 and a second end 140. Each disc guide 136A-B includes a generally planar interior wall 142 and a spaced apart and generally parallel planar exterior wall 144, as shown in FIG. 6. Interior wall 142 includes a series of channels 143 formed in the interior wall 142 to allow for escaped catalyst material to drop away from disc guides 136A-B. Each disc guide 136A-B includes a recessed elongate guide channel 146 that extends from first end 138 to second end 140.

Each guide channel 146 of the disc guides 136A-B includes a generally planar side wall 148 and a generally planar wall 150 that extends between first end 138 and second end 140 of disc guides 136A-B. Side wall 148 of guide channel 146 is generally parallel to interior wall 142. Wall 150 of guide channel 146 extends generally perpendicularly between interior wall 142 and side wall 148 of guide channel 146. Each disc guide 136A-B includes a seat 152 that extends generally linearly between first end 138 and second end 140. Each seat 152 of a disc guide 136A-B is adapted to receive and interlock with a respective seat 106 of orifice plate 92. Disc guide 136A is coupled to first side edge 102 of orifice plate 92 and disc guide 136B is coupled to second side edge 104 of orifice plate 92, such that guide channels 146 of disc guides 136A-B are in opposing spaced relationship with respect to one another and extend generally parallel to one another. Guide discs 136A-B preferably include a layer of STELLITE alloy in order to increase wear and temperature resistance.

Each disc guide 136A-B includes a wedge 160, as shown in FIG. 5. Wedge 160 may be located on, and extend outwardly from, interior wall 142 of disc guides 136A-B. Each wedge 160 includes a generally planar and inclined wedge surface 162. Wedge surface 162 is inclined or sloped with respect to a plane including wall 150 of guide channel 146. Wedge surface 162 slopes toward wall 150 of guide channel 146. Wedge 160 is spaced apart from second end 140 of a disc guide 136A-B. Wedge 160 is closer to second end 140 than it to first end 138 of disc guides 136A-B. Wedge surface 162 is spaced apart from bottom surface 96 of orifice plate 92, and is located at an inclined angle with respect to the bottom surface 96 of orifice plate 92.

Wedges 160 of disc guides 136A-B are positioned so that disc 166 can travel linearly with respect to orifice plate 92 and then, near the end of its travel, move closer to and engagement with seal member 126 to seal off orifice 114. As valve disc 166 engages wedges 160, valve disc 166 is raised off of wall 150 of disc guides 136A-B. As valve disc 166 is moved rearward from its fully closed position, valve disc 166 starts to ride down wedges, creating an air gap between valve disc 166 and seal member 126 to allow for hot gases to exit from orifice 114 but preventing the unwanted flow of catalyst material.

Each disc guide 136A-B may include a wear resistant liner 164, which is a layer formed from a wear resistant material, such as the stellite alloy. Wear resistant liner 164 may form side wall 148 and wall 150 of guide channel 146, interior wall 142, wedge 160 and wedge surface 162, of each disc guide 136A-B. Orifice plate 92 and disc guides 136A-B may generally be formed from a metal material, although the wear resistant liner 164 may be formed from metal, ceramic or other wear resistant materials.

Gate assembly 90 also includes a valve disc 166. Disc 166 may comprise a generally rectangular plate having a proximal end 168 and a spaced apart distal end 170. Disc 166 includes a generally planar top surface 172 and a generally planar bottom surface 174 that is spaced apart from and generally parallel to top surface 172. Disc 166 includes an elongate generally linear first side edge 176 and a spaced apart and generally parallel elongate linear second side edge 178. First side edge 176 of disc 166 is adapted to be slidably received and located within guide channel 146 of disc guide 136A of receptacle 91. Second side edge 178 of disc 166 is adapted to be slidably received and located within guide channel 146 of disc guide 136B of receptacle 91. Disc 166 is adapted to be selectively slidable within guide channels 146 with respect to disc guides 136 A-B and orifice plate 92 of receptacle 91 along a generally linear axis 180 which is generally perpendicular to central axis 62.

Disc 166 also includes a first elongated groove 167 and a second elongated groove 169. Grooves 167 and 169 engage and slide within guide channels 146 of disc guides 136A-B. Grooves 167 and 169 include a first wall 171 and a second wall 173 that is generally perpendicular to first wall 171. First wall 171 of grooves 167, 169 slides along wall 150 as disc 166 is moved with respect to disc guides 136A-B.

As shown in FIG. 7, disc 166 includes spaced apart wedges 184A and 184B that extend upwardly from first wall 171 of grooves 167, 169. Each wedge 184A-B includes a generally planar and inclined wedge surface 186. Wedge surfaces 186 of wedges 184A-B are generally coplanar with one another. Each wedge surface 186 of wedges 184A-B extends and slopes outwardly away from first wall 171 of disc 166 toward bottom surface 174. Wedges 184A-B are set off from proximal end 168 of disc 166. The location of the wedges 184A-B help evenly raise the proximal and distal ends 168, 170 simultaneously as the disc 166 is moved from a partially open position to a fully closed position. Wedge surface 186 of wedge 184A is adapted to slidably engage and mate with wedge surface 162 of wedge 160 of disc guide 136A to act as a cam to translate linear movement of the valve disc 166 to move valve disc 166 toward orifice plate 92. Wedge surface 186 of wedge 184B is adapted to slidably engage and mate with wedge surface 162 of wedge 160 of disc guide 136B. As the disc 166 is moved from an open position to a closed position, wedges 184A-B of disc 166 engage with wedges 160, 162 of disc guides 136A-B. Sliding engagement of the wedges causes linear movement of disc 166 to also have translational movement that is perpendicular to the linear movement.

Top surface 172, first and second side edges 176 and 178, distal end 170, grooves 167 and 169, and wedge surfaces 186 of wedges 184A-B, may include a wear resistant cover made from a wear resistant material, such as STELLITE alloy. Proximal end 168 of disc 166 includes a connector 190. As shown in FIG. 5, connector 190 may comprise a generally T-shaped slot 192 extending between top surface 172 and bottom surface 174. T-shaped slot 192 includes a leg having a proximal end that forms an opening in proximal end 168 of disc 166. T-shaped slot 192 also includes opposing recesses that extend outwardly in opposite directions from a distal end of the leg of T-shaped slot 192. Slot 192 is designed to allow disc 166 to move laterally and translate upward to make a seal upon closing of the disc 166, without putting unwanted side loads on actuating stem 196, which could cause stem 196 to bend or otherwise become damaged. Disc 166 may be made from a metal material, although the wear resistant cover layer may be made from metal, ceramic or other wear resistant materials.

Offset of guides 136A-B on the solid/notches section is approximately 4.5 inches backset from the port opening 114. Offset of guide inclined plane or wedges 160 from the port 114 opening is 3 inches. Typical wear or erosion on guides on prior art valves is typically at the end of the guides under the orifice plate overhang. The spray effect of materials exiting the port 114 from the differential pressure, in the present invention, is directed more forward than where the wedges 160 are located, so that the effect of erosion will not affect the overall performance of the wedges 160 of the guides 136A-B. The wedges 160 area are formed as part of guides 136A-B and are not a separate component. The disc 166 by design does not stick in the closed position due to the steeper inclined plane and single entity disc 166 against the seat 126.

Figure 15:
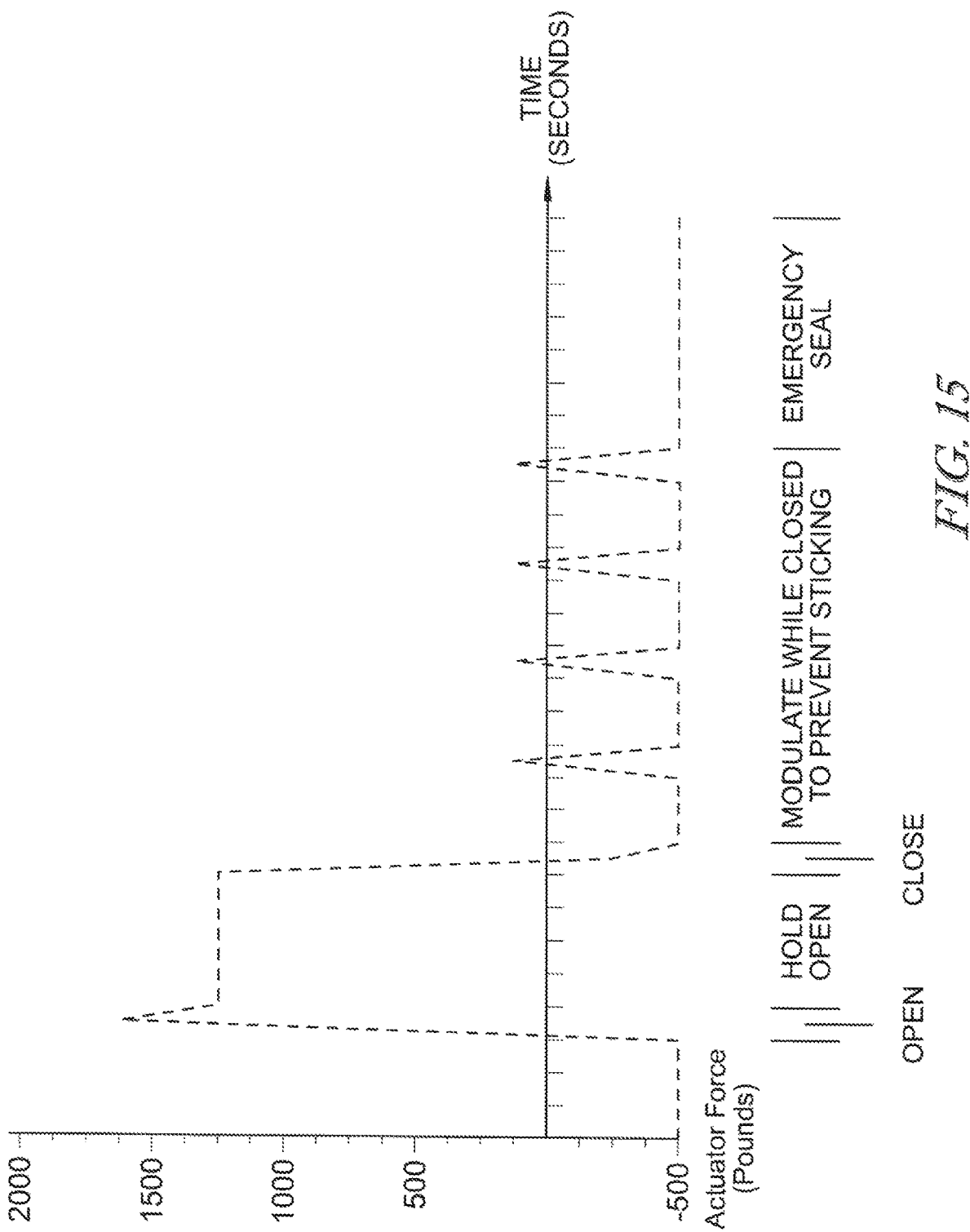
FIG. 15 is a graph illustrating actuator force applied to the valve disc of the valve versus time, and illustrating the position of the valve disc relative to the orifice plate with respect to time and to the actuator force applied to the valve disc.

Disc 166 preferably includes three inches of refractory material 191 on the nose 197 where the pressure drop affect will take place, as shown in FIG. 15. STELLITE alloy retainers are positioned between refractory material 191 to aid in retaining refractory material 191. Disc 166 also include a seat ring member 193 that matches with the seat 126 of orifice plate 92 to form a seal with seat 126 when disc 166 is in the fully closed position. Seat ring member 193 is preferably made from the STELLITE alloy and surrounds a center region 195, which include a refractory material. Disc 166 preferably includes 6.5 inches of overlap when disc 166 is in the closed position, which provides more shutoff functionality even if the seat ring member 193 was not able to fully seal with seat 126 of orifice plate 92.

Disc 166 top surface center region 195, nose 197 and leading edge 197 under the disc 166 are all rebuildable meaning that the refractory material, after it has been damaged from heat and erosion can be replaced with new refractory material. Seat ring member 193 of disc 166 is arranged to provide 360 degrees of surface that matches to the same shaped 360 surface of the seat 126 of the orifice plate 92. Disc seating surfaces, incline mating surfaces, and runners have a STELLITE alloy overlay to reduce wear caused by the extreme operating conditions. Orifice plate 92 seat 126 has the same shape as the seat ring member 193 and are configured to make contact together at 1% before the fully closed position of disc 166 to allow for potential wear of the inclined planes surfaces.

The orifice plate 92 seating surface 126 is backset from the port edge where the pressure drop exist by 3 inches. The orifice plate 92 is made with a raised port so that if there is any cutting of the orifice plate 92 on the backside 199 (toward open position) the orifice plate refractory surface will be eroded and not the base metal of the orifice plate 92, thereby making the orifice plate 92 completely rebuildable, such that the refractory material can be replaced.

The guides 136A-B are preferably made with the wedges 160 as a solid unitary piece and not welded on or secured with fasteners. This is to provide maximum strength for the inclined plane. The guides 136A-B are 'taller' on long side 146 of the 'L' shape to provide greater strength to the guide and the area where the inclined plane is located. The guides 136A-B are also wider on the short side 142 of the 1' to provide more runner support to the guide. The guides 136A-B include notches 143 and include a layer of STELLITE alloy for all wearing surfaces.

The disc 166 includes an additional offset of 1.5 inches on the sides 176, 178 so that seat ring member 193 has adequate surface area available to make a seal. Refractory material of orifice plate disc 166 around the edges is secured with retention tabs. Refractory material located in center area 195 is secured with hex mesh or hexagonal shaped retention members to maintain its position. This creates a hexagonal pattern of refractory tiles in the center area 195. Orifice plate 92 and disc 166 during manufacture are scribed during the machining process for the retainer tabs and hex mesh to secure the refractory material so that the fabricator knows exactly where to put the retainer tabs and hex mesh exactly, thus taking a large amount of human input out of the fabrication stage. This arrangement makes all components to be as per the exact design that the engineers chose.

Figure 2:
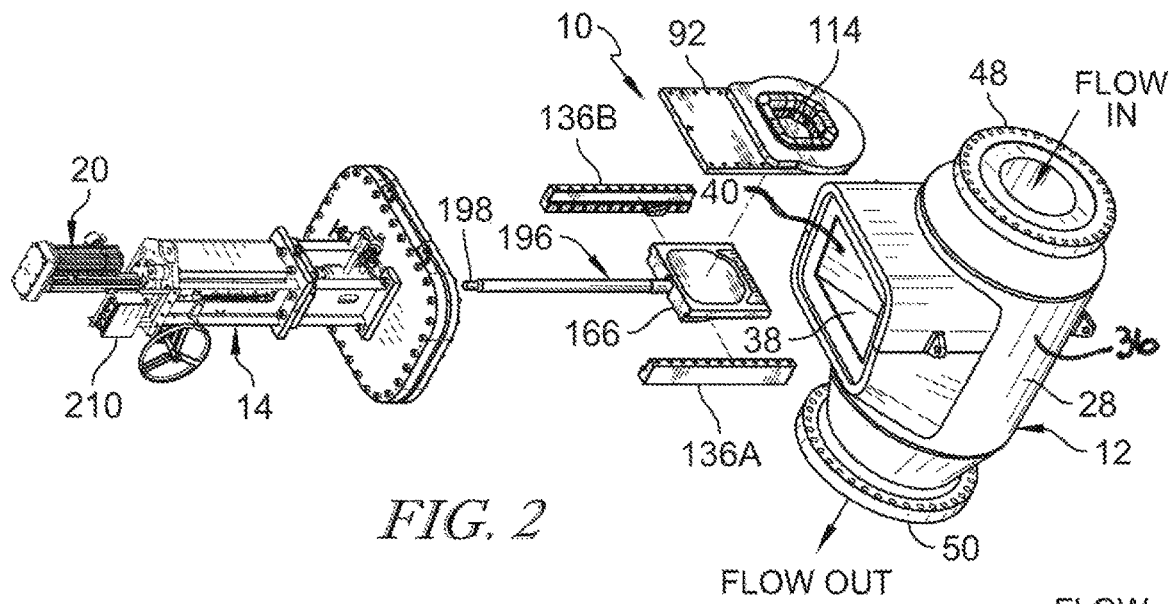
FIG. 2 is a partially exploded front view of the slide valve of FIG. 1.
Figure 3:
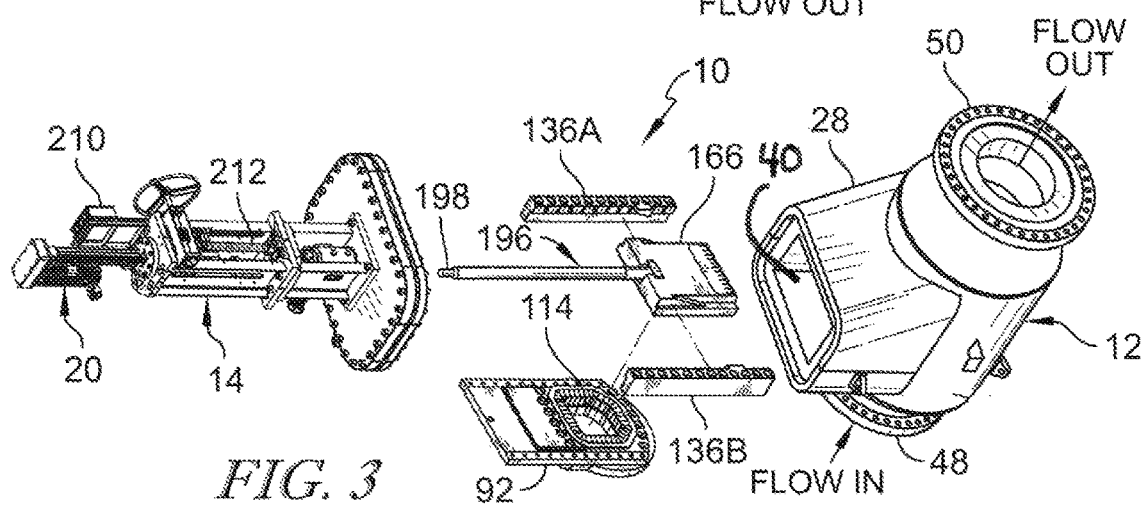
FIG. 3 is a partially exploded rear view of the slide valve of FIG. 1.
Figure 4:
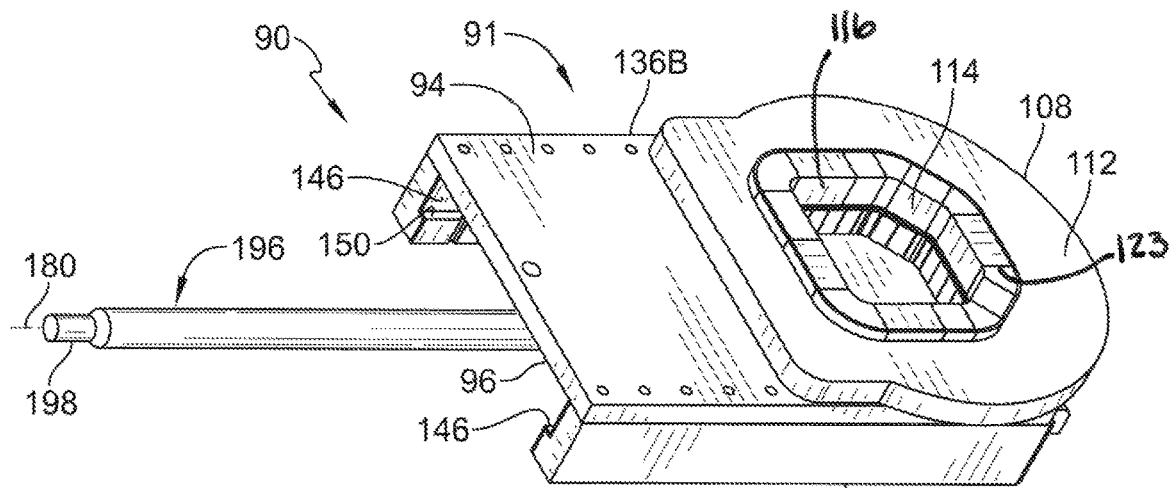
FIG. 4 is a front perspective view of the gate assembly of the slide valve showing the disc receptacle and the actuating stem that selectively slides the valve disc with respect to the disc receptacle between a fully-retracted fully-open position and a fully-extended fully-closed tight shutoff position.

Valve 10 includes elongate actuating stem 196 having a first end 198 and a second end 200, as shown for example in FIGS. 2 and 7. First end 198 of actuating stem 196 is adapted to be coupled to actuator 20. Second end 200 of actuating stem 196 is adapted to be movably coupled to proximal end 168 of disc 166. Second end 200 of actuating stem 196 includes a connector such as a generally T-shaped head 202 that is adapted to be loosely received and located within T-shaped slot 192 of disc 166 and that movably interlocks disc 166 to actuating stem 196. Actuating stem 196 extends between first end 198 and second end 200 along axis 180. T-shaped head 202 includes opposing lugs 201 that extend outwardly from second end 200 transversely to axis 180 and that are adapted to be loosely received in the opposing recesses of T-shaped slot 192. Actuating stem 196 is adapted to be moved linearly along axis 180 by actuator 20 selectively toward or away from actuator 20 along axis 180. T-shaped head 202 of actuating stem 196 and T-shaped slot 192 of disc 166 form a moveable flexible and pivotal connection between disc 166 and actuating stem 196, such that actuating stem 196 can selectively move disc 166 with respect to receptacle 91, as actuating stem 196 moves generally linearly along axis 180, while disc 166 is capable of pivotal and sideways transverse movement with respect to T-shaped head 202 of actuating stem 196 so that disc 166 can move into sealing engagement with orifice plate 92 in the closed position. Second end 200 of actuating stem 196 is not rigidly connected to disc 166. Disc 166 therefore does not impart bending forces to actuating stem 196 as actuating stem 196 slidably moves disc 166 laterally and then up wedges 160 of guide members 136A-B. Other types of flexible connections between actuating stem 196 and disc 166 may also be used, such as a ball and socket or hinge pin, for example.

As shown in FIG. 8, actuating stem 196 extends outwardly through opening 40 in body 12 and into housing 14 through a packing ring 206 that extends closely around actuating stem 196. Actuating stem 196 also slidably extends through a packing gland 208 that extends closely around actuating stem 196. First end 198 of actuating stem 196 is coupled to actuator 20. Actuator 20 may comprise a hydraulic cylinder or an electric actuator including an electric motor 210. Actuator 20 is adapted to selectively movably slide actuating stem 196 and disc 166 generally linearly along axis 180 between a fully-extended fully-closed tight shutoff position, as shown in FIG. 8, and a fully-retracted fully-open position, as shown in FIG. 14, with respect to body 12, receptacle 91 and orifice plate 92. Housing 14 includes a resilient coil spring 212 that resiliently biases actuating stem 196 and disc 166 away from actuator 20 and toward side wall 32 of body 12 along axis 180, and disc 166 toward the fully-extended fully-closed tight shutoff position.

Inlet 48 of body 12 is adapted to be placed in communication with a supply of a hot gas-solid mixture. The gas-solid mixture may comprise a gas, such as air, and solid particles, such as a catalyst. The gas-solid mixture is supplied under pressure to inlet 48. When disc 166 is in the fully-extended fully-closed tight shutoff position as shown in FIG. 11, disc 166 tightly and completely seals orifice 114 and inlet passageway 56 from chamber 38 and outlet passageway 70 and thereby prevents the flow of the gas and of the particles in the gas-solid mixture from flowing from inlet passageway 56 to outlet passageway 70.

When actuator 20 slidably moves actuating stem 196 and disc 166 from the fully-retracted fully-open position of disc 166 toward the fully-extended fully-closed position of disc 166, wedge surfaces 162 of wedges 160 of receptacle 91 respectively engage wedge surfaces 186 of wedges 184A-B of disc 166. Wedge surfaces 162 of wedges 160 act as a cam to wedgingly move disc 166 in a direction generally transverse to axis 180 and generally parallel to central axis 62 into sealed engagement with orifice plate 92 and sealing surface 128 of ring 126. Disc 166 thereby tightly and completely seals orifice 114 and inlet passageway 56 of inlet 48 from chamber 38 of body 12 and outlet passageway 70 of outlet 50 and prevents the flow of gas and the flow of particles in the gas-solid mixture from flowing through orifice 114 into chamber 38 and outlet passageway 70.

When manufacturing the valves 10, various inclinations will be used for the wedges and the inclination will vary depending upon the specific function of the valve or the size of the valve. Inclinations of the wedges can range from about 9 degrees to about 20 degrees and preferably from about 10 degrees to about 15 degrees. Inclinations less than 8 degrees could cause potential locking or sticking of the valve disc 166 in the closed position, making it difficult to open under normal operation of the valve 10. Weight of valve disc 166 and flow through orifice 114 allows the wedges to maintain contact when valve disc 166 is moved toward the open position from the closed position.

When it is desired to allow the flow of the gas-solid mixture from inlet passageway 56 to chamber 38 and outlet passageway 70, and thereby through valve 10, actuator 20 slidably retracts actuating stem 196 and disc 166 along axis 180 to the fully-retracted fully-open position as shown in FIG. 14. As shown in FIG. 14, disc 166 has been slid along axis 180 away from side wall 32 of body 12 and with respect to orifice plate 92 such that disc 166 does not cover any portion of orifice 114 in orifice plate 92. When disc 166 is in the fully-retracted fully-open position as shown in FIG. 14, the gas-solid mixture is allowed to flow from inlet passageway 56, through orifice 114 in orifice plate 92, through chamber 38 of body 12, and through outlet passageway 70 of outlet 50 and thereby outwardly from valve 10.

The valve 10 is used for controlling the flow of gas, liquid and catalyst material in a fluid catalytic cracking process. The valve 10 includes the valve body 12 configured to have internal chamber 34. Valve body 12 includes inlet 48 and outlet 50. Valve 10 includes orifice plate 92 positioned within chamber 34. Orifice plate 92 is formed to include orifice 114. Valve 10 also includes the disc guide 136 that is positioned proximate orifice 114. Disc guide 136 includes guide channel 146. Disc guide can be a single piece unit, a multiple piece unit, be part of the orifice plate 92 or part of the valve body 12. Valve 10 also includes valve disc 166 that is configured to slide along guide channel 146 from a fully opened position in which gases, liquids and catalyst materials can pass through orifice 114 to a fully closed position in which orifice 114 is blocked, preventing the flow of gases, liquids or catalyst materials through orifice 114. The valve also includes a cam located in internal chamber 34 of valve body 12. The cam can be in the form of wedges 160, wedges 184 or can be some other cam or inclined plane surface located in the valve body or on the orifice plate. Movement of valve disc 166 from the fully opened position toward the fully closed position causes valve disc 166 to slide linearly along guide channel 146 until a point in the travel of valve disc 166 where the cam causes translational movement of valve disc 166 toward orifice plate 92 to seal valve disc 166 against orifice plate 92 to block flow through orifice 114.

When disc 166 is in the fully-extended fully-closed tight shutoff position, as shown in FIGS. 8-10, disc 166 can potentially become stuck in this position, making movement of the disc 166 to the fully-retracted fully-open position difficult, if not impossible, due to the wedging force with which disc 166 is pressed against orifice plate 92 by wedges 160 and 184A-B. Disc 166 may also potentially become stuck due to particles of the gas-solid mixture becoming located between wedge surfaces 162 of wedges 160 and wedge surfaces 186 of wedges 184A-B, and between top surface 172 of disc 166 and orifice plate 92, and that may have become sticky from heating and thereby may cause the respective engaging surfaces to adhere to one another.

In order to prevent disc 166 from becoming stuck in the fully-extended fully-closed tight shutoff position as shown in FIGS. 8-10, disc 166 may be periodically modulated or slidably moved between the fully-extended fully-open tight shutoff position and a slightly partially-retracted non-tight shutoff position as shown in FIGS. 11-13. When actuator 20 partially retracts actuating stem 196 and disc 166 along axis 180 to the partially-retracted non-tight shutoff position, as shown in FIGS. 11-13, disc 166 is moved a very short distance along axis 180 and away from side wall 32 of body 12. Top surface 172 of disc 166 is thereby no longer wedged into tight sealing engagement with orifice plate 92 and is spaced apart a short distance from orifice plate 92 thereby creating a short air gap 216 between top surface 172 of disc 166 and orifice plate 92. The width of air gap 216 may be shorter that the smallest diameter of the particles in the gas-particle mixture. Air gap 216 may allow a small flow of the gas in the solid-gas mixture in orifice 114 of orifice plate 92 to pass through air gap 216 into chamber 38 of body 12 and into outlet passageway 70 of outlet 50, but air gap 216 is sufficiently small to prevent the passage of the particles in the gas-particle mixture in orifice 114 of orifice plate 92 to pass through air gap 216 and into chamber 38. Disc 166 thereby prevents the flow of particles in the gas-particle mixture in inlet passageway 56 and orifice 114 from flowing through orifice 114 into chamber 38 of body 12 and outlet passageway 70 of outlet 50 when disc 166 is in the partially-retracted non-tight shutoff position, such that the flow of particles in the gas-particle mixture remains shutoff.

The modulating or cycling of disc 166 between the fully-extended full-closed tight shutoff position, as shown in FIG. 8, and the partially-retracted non-tight shutoff position, as shown in FIG. 11, prevents sticking of disc 166 in the fully-extended fully-closed tight shutoff position. FIG. 15 is a graph that illustrates the movement of disc 166 between the fully-retracted fully-open position and the fully-extended fully-closed tight shutoff position, and the modulating of disc 166 between the fully-extended fully-closed tight shutoff position and the partially-retracted non-tight shutoff position, with respect to the force applied to disc 166 by the actuator 20 and with respect to time.

Actuator 20 is adapted to control the magnitude of the linear thrust force applied by actuator 20 to actuating stem 196 to approximately plus or minus one pound of force from the desired thrust force. Actuator 20 may control the thrust force for seating disc 166 in the fully-extended fully-closed tight shutoff position to approximately 5% to 10% of the total available force from actuator 20. Actuator 20 may provide a retracting pulling force to actuating stem 196 and disc 166 of approximately 30% of the total available force from actuator 20.

Actuator 20 moves disc 166 toward the fully-extended fully-closed tight shutoff position to a desired position by a position measurement of disc 166, and may then slightly retract disc 166 by up to about 0.5% of movement, and then extend disc 166 to the fully-extended fully-closed tight shutoff portion with a desired thrust force. This allows actuating stem 196 to realign itself with disc 166 to eliminate any bending in actuator stem 196 when disc 166 is driven to the fully-extended fully-closed tight shutoff position. Actuator 20 will then selectively modulate disc 166 between the fully-extended fully-closed tight shutoff position and the partially-retracted non-tight shutoff position with approximately 0.5% movement, wherein the required retraction force for moving disc 166 to the partially-retracted non-tight shutoff position is monitored. As long as the retracting force stays below a selected magnitude, valve 10 is considered to be operating normally. If disc 166 sticks or becomes sticky in opening, such that a larger retracting force is needed to retract disc 166, then the closing force applied to disc 166 will be reduced by about 2%. The magnitude of the retraction force applied to disc 166 may also be increased by about 5%. Disc 166 will remain reliably movable as desired.

Actuator 20 may be programmed to selectively open and close valve 10 on a programmed basis to control the quantity of hot catalyst from the regenerator to flow through valve 10. Tons of catalyst per day or per week can be calculated and controlled for flow through valve 10. The control of catalyst flow enables the temperature of piping downstream of valve 10 to be controlled.

In the unlikelihood of potential sticking of the disc into the seated position the hydraulic circuit has been designed to reduce the amount of force that will seat the valve disc 166 during an emergency 'closure' of the valve disc 166. The hydraulic circuit functions when there is a loss of power or a signal provided from the command center of the refinery FCCU to close the valve on an emergency basis. When the emergency command is given, the hydraulic system dumps fluid from an accumulator (hydraulic piston type) directly to the rear port of the cylinder and drives the valve disc 166 to the closed position.

No electricity is needed move the valve disc 166 to the closed position as it works on a loss of power and is considered failsafe. Because the emergency trip system works with no electricity available, there is no method to 'control' the amount of force applied to the disc in a normal ESD circuit. The hydraulic circuit includes a hydraulic fluid pressure reducing valve to control the fluid pressure being driven from the accumulator to the cylinder during the emergency trip function. The control circuit controls the amount of force applied to the valve disc 166 and is adjustable for use in future applications of different size valves and difference loads being controlled in the closing direction.

While modulating or cycling of disc 166 is optional, testing has shown that unwanted sticking of the valve disc 166 that was expected did not occur. This is due to the angle used for the wedges on the guides and the bottom of the disc. During design and testing care was taken, through the effort listed above, to protect the amount of force the valve disc 166 was driven into the seat 128 but it was determined that the valve disc 166 can be driven into the seat at full pressure, and it takes very little force to pull the disc out of the seat. For example, when driving the valve disc 166 into the seat to the fully closed position at 8800 lb/sf and it was expected that it 'could' take 10,000 to 12,000 lb/sf to open the valve, but testing showed that it only took 300 lb/sf to 350 lb/sf to re-open the valve disc 166. Full closure of the disc 166 was performed multiple times to prove that the valve disc 166 would not stick in the closed position.

Under normal operation, the valve disc 166 is typically at 50% of the port open position and the valve disc 166 still can be closed under an operating condition. Since this condition of the valve disc 166 being closed exists, then the hydraulic control system for the valve is programmed to 'control the thrust' in the closing direction. The control is part of the function of the slide valve design to make sure that the valve disc 166 always has more force capability to pull the valve disc open from the closed position.

The slide gate valve 10 is used for controlling the flow of gas, liquid and catalyst material in a fluid catalytic cracking process and includes a valve body 12 having an internal chamber 34 and formed to include an inlet 48 and an outlet 50. The valve 10 includes an orifice plate 92 positioned within the chamber 34 and the orifice plate 92 is formed to include an orifice 114. The valve 10 also includes first and second disc guides 136A-B that are located on opposite sides of the orifice 114, the disc guides 136A-B each include a guide channel 146 and a wedge 160 having a wedge surface 162. The valve 10 also includes a valve disc 166 positioned between the first and second disc guides 136A-B and is configured to slide along the disc guides 136A-B from a fully opened position in which gases, liquids and catalyst materials can pass through the orifice to a fully closed position in which the orifice 114 is blocked, preventing the flow of gases, liquids or catalyst materials through the orifice.

The valve disc 166 includes a pair of wedges 184A-B each having a wedge surface 186. Movement of the valve disc 166 from the fully opened position toward the fully closed position causes the valve disc 166 to slide linearly along the first and second disc guides 136A-B until a point in the travel of the valve disc 166 where the wedges 184A-B of the valve disc 166 engage the wedges 160 of the first and second disc guides 136A-B to cause translational movement of the valve disc 166 toward the orifice plate 92 to seal the valve disc 166 against the orifice plate 92 to block flow through the orifice 114. The orifice plate 92 includes refractory material 122 positioned radially outward from the orifice 114 and a sealing surface 126 positioned radially outward from the refractory material 122.

The sealing surface 126 includes a layer of a STELLITE alloy. The first and second disc guides 136A-B each include a first end 138 and a second end 140 and the wedges 160 are located closer to the second end 140 than the first end 138 and the wedges are unitary with the first and second disc guides 136A-B. The first and second disc guides each include a guide channel 146 and a planar interior wall 142, wherein the wedge 160 extend outward from the interior wall 142. The valve disc 166 includes a top surface having a center region having a refractory material 195 and a seat ring member 193 positioned radially outwardly from the center region, the seat ring member 193 adapted to seal against the sealing surface 126 of the orifice plate 92 when the valve disc 166 is in the fully closed position. The valve disc 166 includes a nose 197 and refractory material 191 that wraps around the nose 197 of the valve disc 166. The wedges 184A-B of the valve disc 166 are unitary with the valve disc 166. The valve disc 166 is formed to include a slot 192 configured to accept an end 200 of an actuator stem 196 that is moved by an actuator 20 along axis 180, wherein the connection of the actuator stem 196 to the valve disc 166 permits movement of the valve disc 166 with respect to the actuator stem 196 when the valve disc 166 is moved from the fully opened position to the fully closed position. The actuator 120 is configured to periodically partially retract the actuating stem 196 and the valve disc 166 along linear axis 180 to a partially-retracted non-tight position so that the valve disc 166 is not in sealing engagement with the orifice plate 92 and is spaced apart a short distance from orifice plate 91 creating an air gap and then moves the valve disc 166 back to the fully closed position.

Various features of the invention have been particularly shown and described in connection with the illustrative embodiment of the invention, however, it must be understood that these particular arrangements may merely illustrate, and that the invention is to be given its fullest interpretation within the terms of the appended claims.

The invention claimed is:

1. A slide gate valve for controlling the flow of gas, liquid and catalyst material comprising:
   a valve body having an internal chamber and formed to include an inlet, and an outlet;
   first and second spaced apart guide members positioned within the chamber, the members each include a guide channel and a wedge having a wedge surface;
   a valve member having a first side facing the inlet and an opposite second side, the valve member located between the first and second guide members and configured to slide along the guide members from a fully opened position in which gases, liquids or catalyst materials can pass from the inlet to the outlet to a fully closed position in which the flow of gases, liquids or catalyst materials are prevented from exiting the outlet, the valve member including a pair of wedges each having a wedge surface on the second side;
   wherein movement of the valve member from the fully opened position toward the fully closed position causes the valve member to slide linearly along the first and second guide members until a point in travel of the valve member where the cooperating wedge surfaces, cause translational movement of the valve member in the direction of the inlet to seal the inlet to A block flow from the inlet to the outlet;
   an orifice plate having refractory material positioned thereon;
   the orifice plate includes a sealing surface positioned adjacent the refractory material;
   the valve member includes a top surface having a center region having a refractory material; and
   the valve member includes a seat ring member positioned radially outwardly from the center region, the seat ring member adapted to form a seal within the housing when the valve member is in the fully closed position.

2. The slide gate valve of claim 1, wherein the sealing surface includes a layer of a stellite alloy.

3. The slide gate valve of claim 1, wherein the first and second guide members each include a first end and a second end and include wedges that are located closer to the second end than the first end.

4. The slide gate valve of claim 3, wherein the wedges are unitary with the first and second guide members.

5. The slide gate valve of claim 3, wherein the first and second guide members each include a guide channel and a planar interior wall, wherein the wedges extend outward from the interior wall.

6. The slide gate valve of claim 1, wherein the valve member includes a nose and refractory material that wraps around the nose of the valve member.

7. The slide gate valve of claim 1, wherein the wedges of the valve member are unitary with the valve member.

8. The slide gate valve of claim 1, wherein the valve member is formed to include a slot configured to accept an end of an actuator stem, wherein the connection of the actuator stem to the valve member permits movement of the valve member with respect to the actuator stem when the valve member is moved from the fully opened position to the fully closed position.

9. A slide gate valve for controlling the flow of gas, liquid and catalyst material in a fluid catalytic cracking process comprising:
   a valve body having an internal chamber and formed to include an inlet, and an outlet;
   first and second spaced apart guide members that are located within the chamber, each guide member including a wedge having a wedge surface;
   a valve member having a first side facing the inlet and an opposite second side, the valve member located between the first and second guide members and configured to slide along the guide members from a fully opened position in which gases, liquids and catalyst materials can pass through the inlet to the outlet to a fully closed position in which the flow of gases, liquids or catalyst materials is prevented from flowing from the inlet to the outlet, the valve member including a wedge surface on the second side;
   an actuator stem having a first end coupled to the valve member;
   an actuator coupled to a second end of the actuator stem, wherein the actuator and the actuator stem are adapted to move the valve member from the fully opened position to the fully closed position;
   wherein movement of the valve member from the fully opened position toward the fully closed position causes the valve member to slide linearly along the first and second guide members until a point in the travel of the valve member where the wedge surfaces causes translational movement of the valve member toward the inlet to create a seal to block flow from the inlet to the outlet;
   an orifice plate having refractory material positioned thereon;
   the orifice plate includes a sealing surface positioned adjacent the refractory material;
   the valve member includes a top surface having a center region having a refractory material; and
   the valve member includes a seat ring member positioned radially outwardly from the center region, the seat ring member adapted to form a seal within the housing when the valve member is in the fully closed position.

10. The slide gate valve of claim 9, wherein the actuator periodically partially retracts the actuating stem and the valve member along a linear axis to a partially-retracted non-tight position so that the valve member is not forming a seal within the housing creating a gap and then moves the valve member back to the fully closed position.

11. The slide gate valve of claim 9, wherein the valve member is formed to include a slot configured to accept an end of the actuator stem, wherein the connection of the actuator stem to the valve member permits movement of the valve member with respect to the actuator stem when the valve member is moved from the fully opened position to the fully closed position.

12. The slide gate valve of claim 9, further including an orifice plate that includes refractory material.

13. The slide gate valve of claim 12, wherein the orifice plate includes a sealing surface positioned adjacent the refractory material.

14. A slide gate valve for controlling the flow of gas, liquid and catalyst material in a fluid catalytic cracking process comprising:
- a valve body having an internal chamber and formed to include an inlet, and an outlet;
- an orifice formed within the chamber;
- a guide member positioned proximate the orifice and having a guide channel and a first incline having a first inclined surface;
- a valve member having a first side facing the orifice and an opposite facing second side, the valve member disc configured to slide along the guide channel of the disc guide member from a fully opened position in which gases, liquids and catalyst materials can pass through the orifice to a fully closed position in which the orifice is blocked, preventing the flow of gases, liquids or catalyst materials through the orifice, the valve member including a second incline having a second inclined surface facing outwardly from the second side;
- wherein movement of the valve member from the fully opened position toward the fully closed position causes the valve member to slide linearly along the guide channel of disc the guide member until a point in the travel of the valve member where the first and second inclined surfaces engage second to cause translational movement of the valve member toward the orifice to form a seal to block flow through the orifice;
- an orifice plate having refractory material positioned thereon;
- the orifice plate includes a sealing surface positioned adjacent the refractory material;
- the valve member includes a top surface having a center region having a refractory material; and
- the valve member includes a seat ring member positioned radially outwardly from the center region, the seat ring member adapted to form a seal within the housing when the valve member is in the fully closed position.

* * * * *